United States Patent [19]
Humphries

[11] 4,005,877
[45] Feb. 1, 1977

[54] VEHICLE PASSENGER RESTRAINT MECHANISM

[75] Inventor: Thomas Milton Humphries, Cupertino, Calif.

[73] Assignee: Arrow Development Co., Inc., Mountain View, Calif.

[22] Filed: Feb. 24, 1975

[21] Appl. No.: 552,769

[52] U.S. Cl. ............................... 280/748; 297/390
[51] Int. Cl.² .......................................... B60R 21/08
[58] Field of Search ............. 280/748; 105/329 SC, 105/344, 346; 297/390, 384, 154; 104/173 ST, 64, 67, 69, 241

[56] References Cited
UNITED STATES PATENTS

| | | | |
|---|---|---|---|
| 1,038,175 | 9/1912 | Miller | 104/241 |
| 2,684,110 | 7/1954 | Stone | 297/154 |
| 3,393,010 | 7/1968 | Steinberg | 280/150 B |
| 3,722,951 | 3/1973 | Ezquerra | 279/390 |
| 3,773,382 | 11/1973 | Coursault | 297/384 |
| 3,829,158 | 8/1974 | O'Conner | 279/390 |
| 3,837,670 | 9/1974 | Hilyard | 280/150 B |
| 3,854,749 | 12/1974 | Fieni | 280/150 SB |

*Primary Examiner*—Robert R. Song
*Attorney, Agent, or Firm*—Limbach, Limbach & Sutton

[57] ABSTRACT

A vehicular passenger restraint mechanism especially adapted for amusement rides wherein the passenger is subjected to changing forces throughout the ride. A passenger restraint arm is pivotably attached at the head location of each passenger seat. The restraint arm pivots from an extreme upward position, that permits the passenger to move into and out of the seat, to a lower restraint position wherein the bottom of the restraint arm rests on the passenger's lap and the remaining portions of the arm simultaneously restrain the passenger's shoulders against the back of the seat. A hydraulic system controllable from one or more locations on a multi-seat amusement ride vehicle permits each passenger to move his or her associated passenger restraint bar either up or down. A mechanical backup is provided with each hydraulic restraint system.

15 Claims, 4 Drawing Figures

VEHICLE PASSENGER RESTRAINT MECHANISM

BACKGROUND OF THE INVENTION

This invention relates generally to passenger restraint mechanism and more specifically to such mechanisms especially adapted for use in vehicles that are subject to extreme motion changes, such as amusement ride vehicles.

There are many applications where passenger restraint mechanisms are useful, such as in automobiles, boats, airplanes, railroad cars, etc. Many types of passenger restraint mechanisms have been developed for vehicles, such as those described in the following patents: U.S. Pat Nos. 3,393,010 — Steinberg (1968); 3,262,716 — Graham (1966); 3,640,572 — Doehler (1972); 3,713,694 — Miller (1973); 3,203,733 — Priest et al (1965); and 3,722,951 — Ezquerra (1973).

A primary goal of the present invention is to provide an improved passenger restraint mechanism for vehicles of amusement rides. Such vehicles are purposely put through rapid motion changes in order to give their passengers thrilling physical sensations. An example of such a ride is one described in co-pending U.S. patent application Ser. No,. 443,814 filed Feb. 19, 1974 by Karl W. Bacon, now U.S. Pat. No. 3,889,605 issued June 17, 1975 of common ownership with the present application, which is of a roller coaster type. The vehicles of the ride disclosed in this co-pending application travel on a pair of tracks that are wrapped in the shape of a helix, thereby causing the car to turn over as it travels through a portion of the ride.

As further objects of the present invention, it is desired to provide a passenger restraint mechanism that is comfortable, easily adjustable by the passenger, one which aids in passenger movement into and out of a seat when it is not restraining the passenger, one that is a sure and positive restraint mechanism and which further is easily controllable by an operator of the amusement ride.

It is yet another object of the present application to provide a cooperative passenger seat shape and passenger restraint bar which accommodates all sizes of passengers from children through large adults.

SUMMARY OF THE INVENTION

These and additional objects are realized by the present invention wherein a plurality of passenger seats are provided in a single vehicle, each seat having its own independent passenger restraint mechanism but where all mechanisms in a vehicle may be connected to a single control of the passenger vehicle so that an amusement ride operator may control all of the restraint mechanisms of a single vehicle at one time. Each seat is provided with a high back and a restraint arm of generally a U-shape is pivotally attached to the top of the seat. The restraint arm is shaped with a middle horizontal portion to serve as a lap restraint and two generally vertical arms spaced apart to surround the passenger's head and urge his or her shoulders against the back of the seat. When in extreme upward position, the passenger restraint arm is located above the passenger's head. A complete support of the passenger against the seat is thus provided by a single passenger restraint arm that is swung into and out of position by the passenger, as permitted by the control mechanism operated by the amusement ride operator.

On the back of each of the seats is a mechanism connected to selectively restrain motion of its associated passenger restraint arm. A hydraulic cylinder is positioned behind each seat with a piston and cylinder operably connected between the seat and the moving passenger restraint arm. A hydraulic fluid path is provided external of the cylinder to permit flow of fluid from one side of the piston to the other as the piston moves. A valve is connected in this fluid path to limit flow therethrough in only one direction or the other depending upon which of two mechanical positions the valve is placed into. A shaft connected to the piston and extending outside of the hydraulic cylinder passes through both ends of the hydraulic cylinder to equalize volume changes on opposite sides of the piston as the piston moves, thereby eliminating the need for any hydraulic fluid accumulator or other fluid reservoir device. A mechanical latch is also provided as a backup to the hydraulic system to prohibit movement of the passenger restraint arm past a certain point in the upward direction when the hydraulic fluid valve is in a position which normally prohibits such movement.

The various aspects of the present invention, as well as additional objects and advantages thereof, will become apparent from the following description of its preferred embodiment which should be taken in conjunction with the accompanying drawings.

DESCRIPTION OF THE PREFERRED EMBODIMENT

Figure 1:
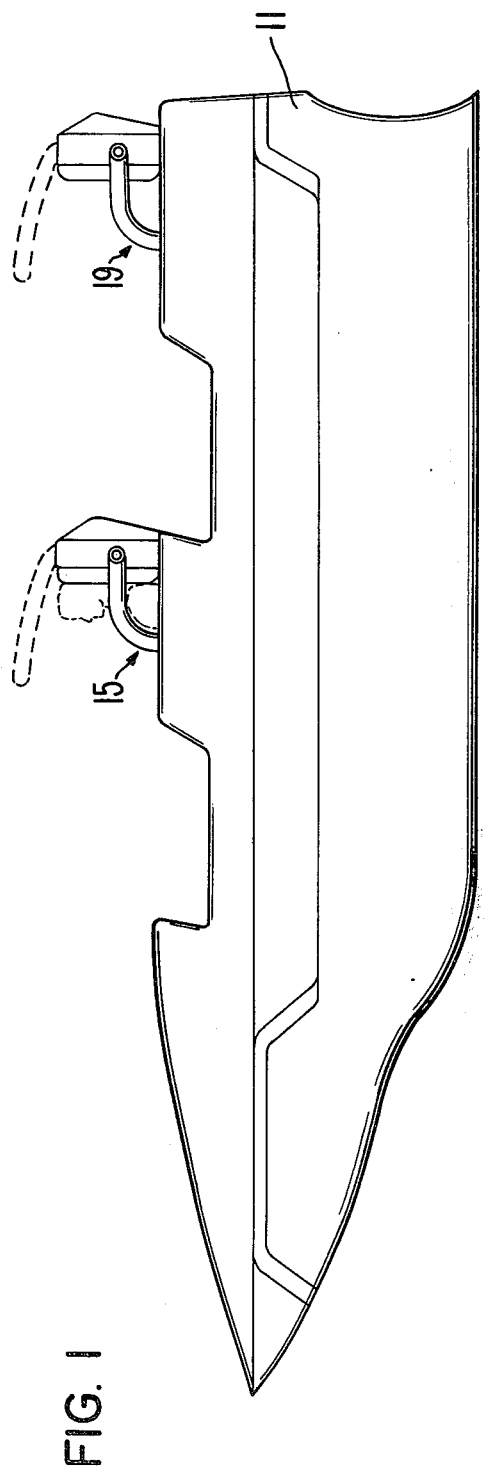
FIG. 1 shows a side view of the primary elements of a vehicle utilizing the present invention.
Figure 2:
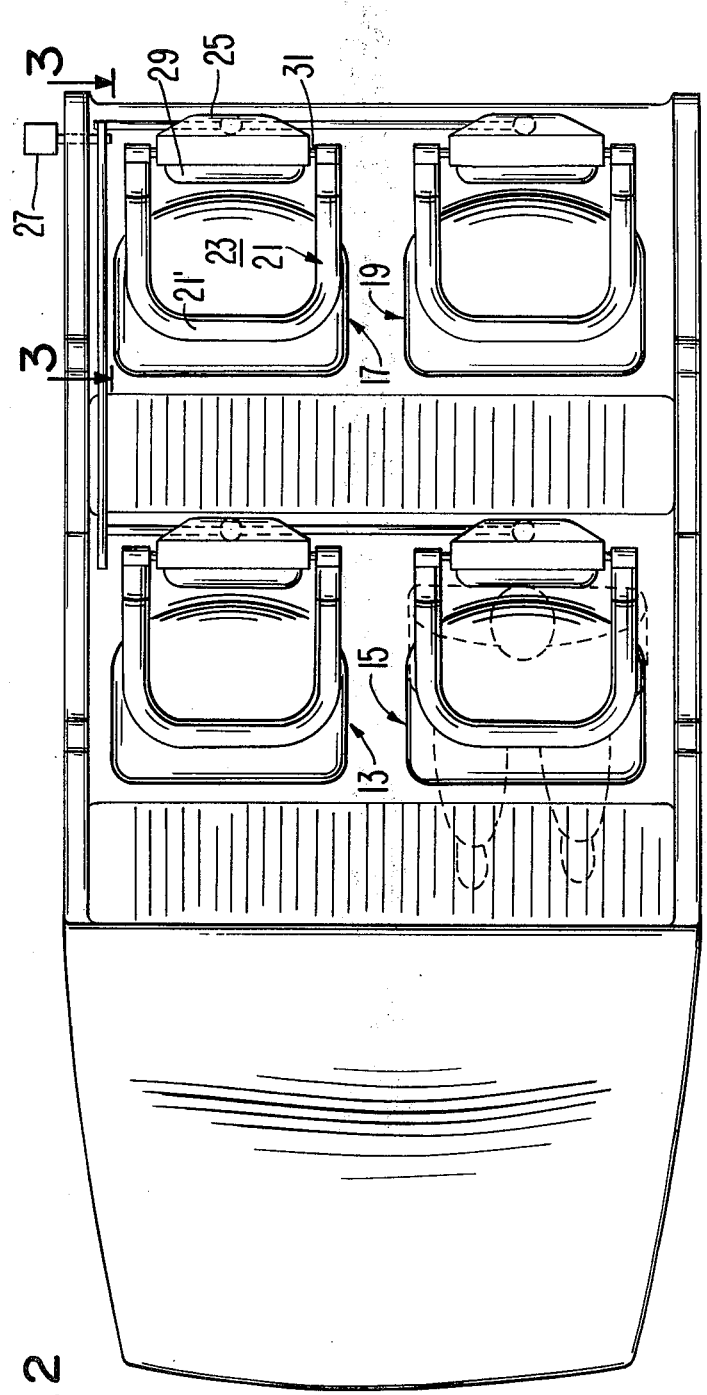
FIG. 2 is the top view of the vehicle of FIG. 1.

Referring initially to FIGS. 1 and 2, a vehicle body 11 includes four passenger seats 13, 15, 17 and 19. Each of these seats faces forward and carries one passenger. The vehicle 11, in this specific example, is provided with wheels (not shown) for traveling on spaced apart tracks of an amusement ride, but it could also be a boat or a car for other types of amusement rides.

Figure 3:
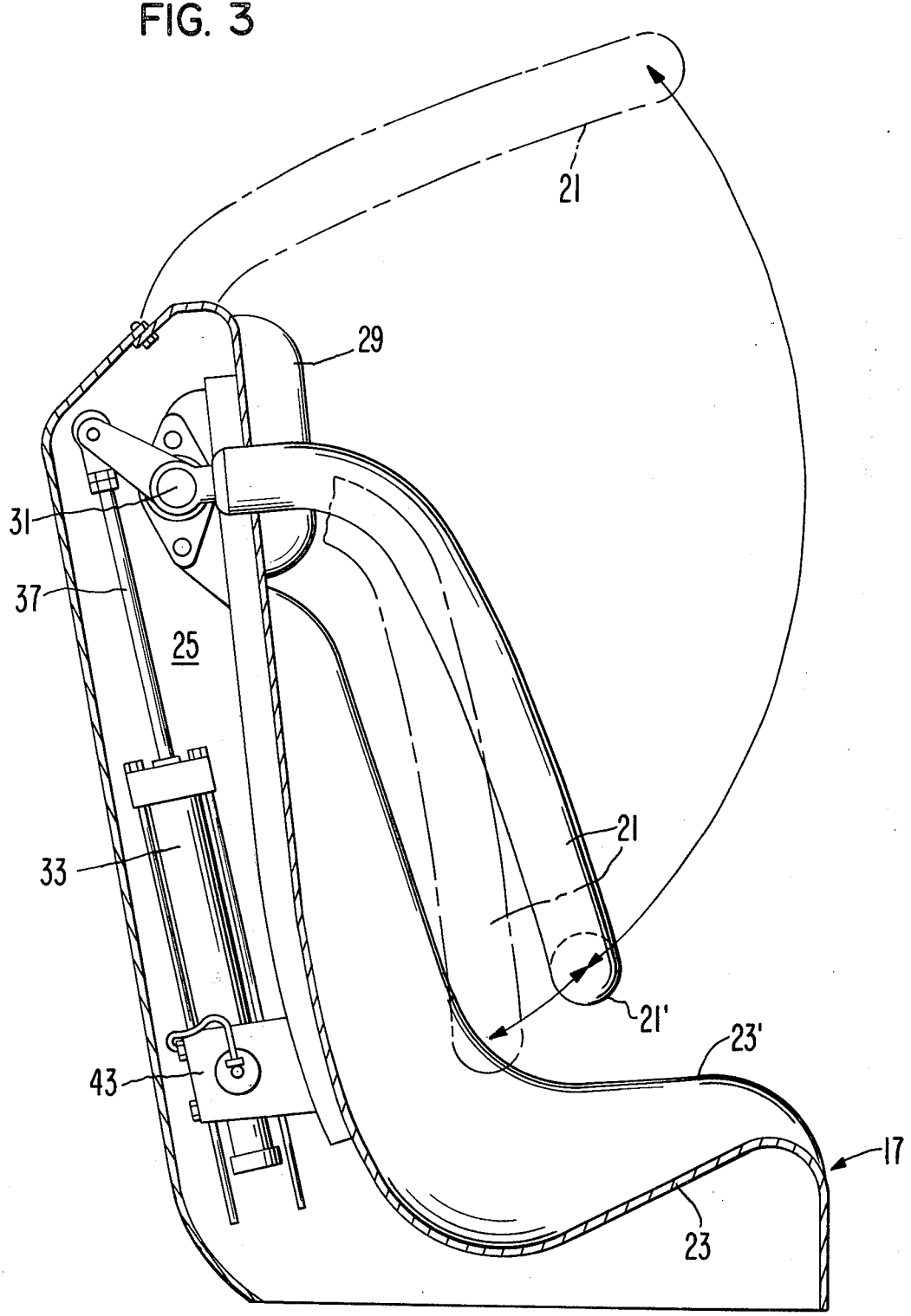
FIG. 3 is a side view of one of the passenger seats of FIG. 2 taken at section 3—3 thereof, with a portion of the seat structure cut away to its middle.

Each of the for seats is of the same construction, the passenger seat 17 and associated restraint mechanism being illustrated in FIG. 3. A passenger restraint arm 21 is movable into just about any position that is required for the comfort of passengers of varying sizes. The seat 17 is constructed principally of a hard molded plastic shell 23, shown cut away down its middle in FIG. 3. The seat shell 23 has mounted on its backside a controlling mechanism 25 that is connected to the passenger restraint arm 21 to hold it in the desired position. In order to release the passenger restraint arm 21, a mechanical connection is made between the control mechanism 25 and a foot actuated control lever 27 (FIG. 2) for actuation by the operator of the amusement ride. The control mechanisms behind each of the four seats are all connected by mechanical linkages to this one control lever 27. Therefore, an amusement ride operator may lock and unlock all of the passenger restraint arms, such as the arm 21, at one time from a single location.

Referring to FIG. 3, the cooperative passenger seat and restraint arm structure will be described. The seat shell 23 is sloped from its front at a steep rate downward, and thence upward as a back rest to where a soft headrest 29 is attached at its top. On each side of the seat are molded as part of the structure 23 raised side portions, such as the side 23' shown in FIG. 3. This seat structure itself contributes to holding the passenger from moving to the side or backwards, and to some extent from moving forward because of the depressed seat structure, when the vehicle is subject to rapid changes in direction as is characteristic of amusement ride vehicles. For further restraint, the passenger restraint arm 21 is provided which is shaped generally in the shape of a "U" as can be seen from the top view of FIG. 2.

The restraint arm 21 includes a horizontal lap bar portion 21' that is formed integrally with two side arms, the two side arms being pivotally mounted at a shaft 31 behind the headrest 29 to the seat structure 17. The passenger restraint bar is thus pivotable with respect to the seat structure 17 from an extreme upward position (shown in dotted outline in FIG. 3) which permits a passenger to get into and out of the seat shell 23, to a lower most possible position (also shown in dotted outline in FIG. 3). The control mechanism 25 behind the seat structure 23 permits the passenger restraint 21 to be adjusted somewhere in between these two extreme positions for the comfort of a passenger, this adjusted position being held throughout the amusement ride until the operator of the ride operates the release lever 27 (FIG. 2).

When in the passenger restraint position, the arm 21, because of its shape as shown in FIG. 3, holds the passenger's shoulders back against the seat shell 23 as well as holding the passenger's lap against the seat with the lap bar portion 21'. The passenger restraint arm 1 preferably has a unitary steel bar center but for the passenger's comfort is covered with a soft, resilient material. Thus, the passenger is comfortably and easily held into the seat 17 by a simple adjustment of the single restraint arm element 21.

Figure 4:
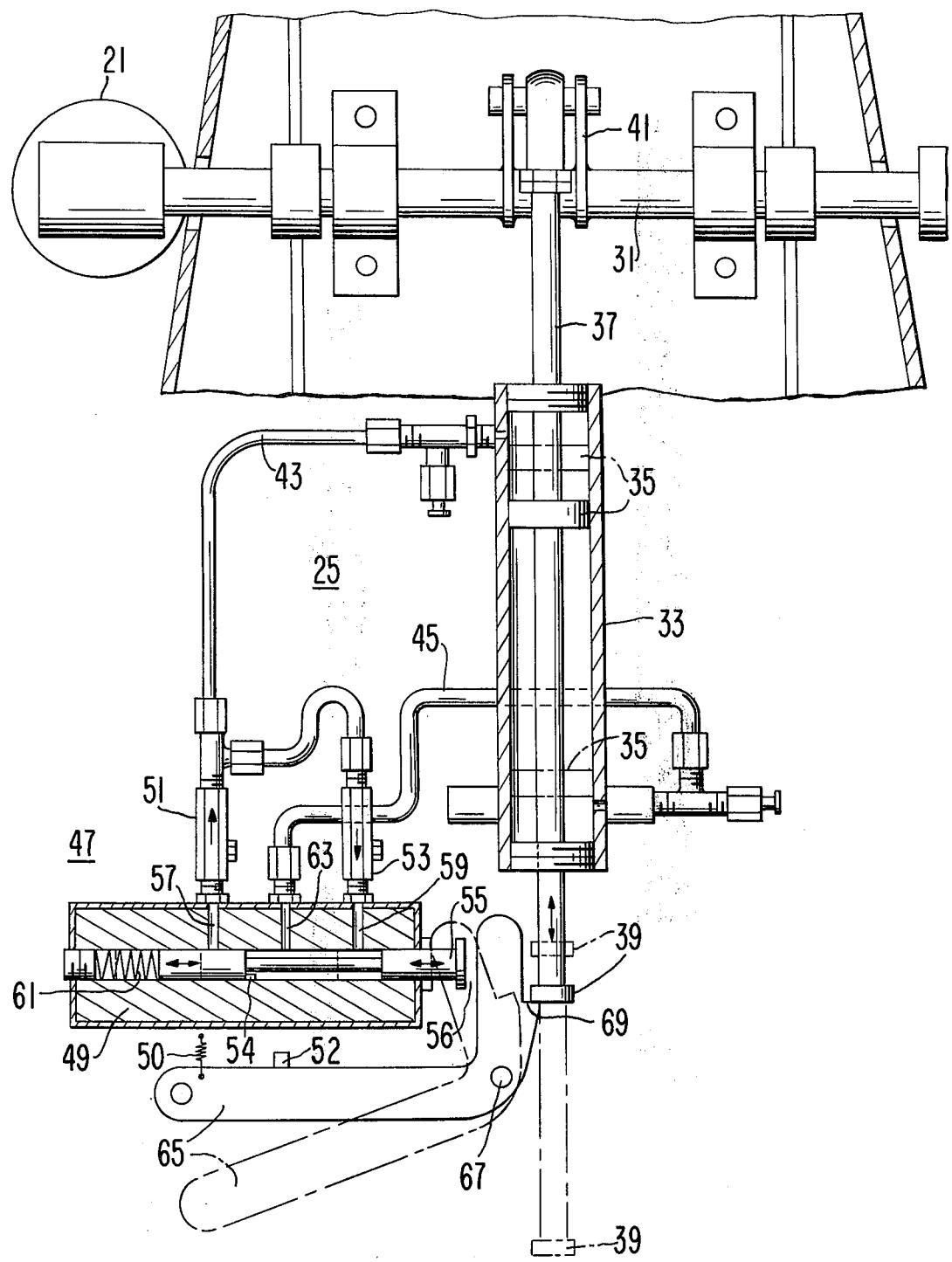
FIG. 4 shows the primary operable elements of the restraint mechanism behind the passenger seat of FIG. 3.

It should also be noted that the combination of the shape of the seat shell 23 and the path traveled by the restraint arm 21 permits the positive restraint of passengers in a range of sizes from children to large adults. The restraint arm 21 is positioned for each passenger for comfort and effective restraint. Referring primarily to FIG. 4, the restraint control mechanism 25 behind the passenger seat shell 23 is explained. A piston cylinder 33 having a piston 35 therein is a principle combination of a hydraulic control system for the passenger restraint arm 21. The piston 35 is attached to a shaft 37 that extends completely through the cylinder 33 and exits through liquid tight seals out of both ends of the cylinder 33. The hydraulic cylinder 33 is positioned generally vertically behind the seat 23. The bottom end of the shaft 37 terminates in a flange 39 while the top end of the shaft 37 is pivotally mounted to a lever arm 41, the lever arm 41 being rapidly attached to the rotating shaft 31. As shown in FIG. 3, the cylinder 33 is pivotally attached at its bottom end to a bracket 43, the bracket 43 being rigidly attached to the back of the seat shell 23. Thus, the cylinder 33 is restrained from movement up and down by its attachment to the seat. Thus, as the passenger restraint arm 21 is moved in an upward direction, the shaft 37 and piston 35 (FIG. 4) are moved downward with respect to the cylinder 33. Conversely, when the passenger restraint arm 21 is pulled downward toward the bottom of the seat shell 23, the shaft 37 and its attached piston 35 move upward within the cylinder 33.

The cylinder 33 is filled with a hydraulic fluid. The cylinder is sealed except for one opening at each end thereof which permits hydraulic fluid to pass into and out of the cylinder 33. At the top end of the cylinder 33, a small hydraulic fluid pipe 43 carries liquid into and out of the cylinder on the top side of the piston 35. Similarly, another small fluid pipe 45 is connected to the bottom end of the piston 35 for transferring liquid into and out of the cylinder 33 on the bottom side of the piston 35. The piston 35 is appropriately sealed to the inner walls of the cylinder 33 so that the fluid therein cannot leak around the piston 35 from one side to the other.

The two fluid pipes 43 and 45 are connected together in a valve assembly 47 in a manner to permit fluid to travel in one direction or the other, but not both. This thus controls, by operation of the valve 47, a single direction in which the passenger restraint arm 21 may be moved. The valve assembly 47 includes a spool valve 49 and two check valves 51 and 53. A spool 55 of the spool valve 49 has two operable positions, one shown in FIG. 4 in solid outline and the other shown in dotted outline. The check valves 51 and 53 are each connected at one end thereof to the fluid line 43 and at their other ends to separate ports 57 and 59 of the spool valve 49. The check valves 51 and 53 permit fluid to flow only in the direction shown by the arrows in FIG. 4; that is, the check valves 51 and 53 permit fluid to flow in opposite directions therethrough.

The spool 55 is normally urged by a spring 61 to its position shown in solid outline in FIG. 4 which communicates the port 59 of the valve 49 with a port 63. The port 63 is connected to the fluid line 45. In that position, hydraulic fluid is permitted to flow from the top side of the piston 35 around through the valve assembly 47 and into the cylinder 33 on the bottom side of the piston 35. Thus, the passenger restraint arm 21 may be pulled downward when the valve 49 is in the solid position shown in FIG. 4, but i may not be pushed upward.

A lever arm 65 pivotally connected at 67 to the back of the seat shell 23 is provided for pushing the spool 55 into the valve 49 to its position shown in dotted outline in FIG. 4. This lever is operated by a connection to the control lever 27 (FIG. 2) on the vehicle. When the valve spool 55 is pushed inward, as shown in dotted outline in FIG. 4, the ports 57 and 63 of the valve 49 are in fluid communication with one another and the piston 35 is now permitted to move downward, but not upward within the cylinder 33, thereby permitting the passenger restraint arm 21 to be moved upward (FIG. 3) to permit a passenger to leave the seat 23.

An advantage of the particular valve structure being described is that when the passenger restraint arm 2 is moved to its maximum upward position as shown in dotted outline in FIG. 3, it then serves as a hand hold to permit the passenger to pull himself up out of the seat and also serves as a hand hold for a subsequent passenger getting into the seat. The passenger restraint arm 21 cannot be pulled down when the spool 55 (FIG. 4) is in its dotted outline position since the piston 35 is restrained by the fluid from moving upward. The check valve 51 that is operable when the spool is in it dotted position will not permit the necessary fluid flow for that piston motion.

Another advantage of the system of FIG. 4 is that no hydraulic liquid accumulators or reservoirs of any kind are required. Because the shaft 37 extends all the way through the cylinder 33, the same volume is displaced on both sides of the piston 35 as it moves within the cylinder 33.

The lever 65 is provided with a stop surface 69 that cooperates with the flange 39 attached to the shaft 37 to mechanically limit downward movement of the shaft 37 when the lever 65 is in its solid lined position shown in FIG. 4. When in the solid lined position shown, the lever 65 sets the hydraulic system to prohibit downward movement of the piston 35, and thus prohibits upward movement of the restraint arm 21. When the lever 65 is operated to its dotted position of FIG. 4, the hydraulic system permits upward movement of the restraint arm 21 and the stop surface 69 thereof is moved out of the way so that the flange 39 may be moved downward, as shown in dotted outline in FIG. 4. The assembly is adjusted so that the mechanical upward stop position of the restraint arm 21, as shown in solid outline in FIG. 3, is high enough from the seat shell 23 to accommodate even the largest person but yet will still restrain smaller persons from slipping out from under it.

The lever 65 is resiliently urged by a spring 50 against a fixed stop 52. A fixed stop 54 limits the extreme position of the spool valve 55 to leave a gap 56 between the rest positions of the lever 65 and valve spool 55 shown in solid outline in FIG. 4. This provides a clearance space 56 that prevents operation of the valve spool 55 when the shaft 37 is moved upward in a manner that causes the flange 39 to wipe against a sloped portion of the lever 65 located below the surface 69.

In operation as part of an amusement ride, an empty vehicle would initially have its passenger restraint arm 21 in the full upright position as shown in dotted outline in FIGS. 1 and 3. The lever 27 would be set by the operator of the ride so that the lever 65 of each of the four passenger restraint mechanisms are in their dotted position of FIG. 4, thereby prohibiting downward movement of the passenger restraint arm 21. This permits the arm 21 to be used as a hand hold for passengers getting into their seats. Once all the passengers are in their seats, the operator of the ride moves the foot lever 27 to its opposite position so that the lever 65 (FIG. 4) of each of the restraint mechanisms in the car 11 is in its solid position. The arm 21 may then be pulled down by each passenger to the position that is most comfortable for him or her. Once it is determined that each passenger has so adjusted their respective passenger restraint bars 21, the vehicle 11 may be dispatched for travel through the amusement ride. When the vehicle returns to the passenger loading position of the amusement ride after passing therethrough, the operator then moves the lever 27 once again to permit the passengers to raise their own passenger restraint arms 2 to the upper most position so they may leave the vehicle 11. The passenger restraint arms 21 are moved entirely by the passengers themselves, there being no other motive force. No springs or other resilient elements are needed and thus there is nothing of this nature to wear out.

The various aspects of the present invention have been described with respect to a preferred embodiment thereof but it will be understood that the invention is entitled to protection within the full scope of the appended claims.

I claim:
1. A mechanism for retaining a passenger in a seat attached to a moving vehicle, comprising:
   means carried by said vehicle and operable by hand for movement between a passenger restraint position near said seat and a passenger loading position away from said seat,
   a hydraulic cylinder having a piston movable therealong between opposite ends thereof and a shaft attached to said piston and extending completely through said cylinder and through said opposite ends in a liquid tight manner for all positions of said piston therebetween, one of said cylinder and one end of said shaft being fixed with respect to said vehicle and the other of said cylinder and said one end of said shaft being attached to said movable restraint mechanism, whereby movement of the restraint mechanism between its extreme passenger restraint and loading positions causes said piston to move between its said opposite ends of the cylinder,
   a fluid path external of said cylinder and connected to carry fluid between said opposite ends of said cylinder,
   fluid control means operably connected as part of said fluid path for permitting fluid to flow in only one direction when actuated into a first mode, that direction being such as to permit said passenger restraint means to move toward said seat but not away from the seat, said fluid control means allowing fluid to flow in an opposite direction when actuated into a second mode,
   a mechanical control operable between two positions relative to said vehicle and connected to actuate said fluid control means into its first and second modes when the mechanical control is, respectively in its first and second position, and
   means cooperatively connectable with another end of said shaft for mechanically preventing relative movement between said cylinder and said shaft in a direction permitting the restraint mechanism to move beyond a fixed position in the direction toward its said loading position when said mechanical control is in its first position, thereby providing a mechanical backup to the hydraulic restraint of the passenger.

2. The mechanism of claim 1 wherein said fluid control means is further characterized by permitting fluid travel in only one direction within said fluid path when it its said second mode, thereby to permit the passenger restraint means to move only away from said seat when mechanical control is in its said second position.

3. A passenger seat assembly for a passenger vehicle, comprising:
   a fixed seat for carrying a single passenger and having a substantially non-distortable passenger carrying surface that includes a high back with a human headrest portion and a bucket like seat sloping downward from its front toward the back and having raised sides, thereby to form a depressed seat surface to restrain a passenger against sliding out of said seat in any direction by the motion of said vehicle,
   a generally U-shaped unitary restraint arm pivotally attached at its free ends on opposite sides of said seat in its region of said headrest and rotatable thereat with respect to said seat between extreme positions toward and away from said seat, a horizontal middle section on said restraint arm positioned to rest on the passenger's lap and adjoining side arm segments between said horizontal section and said pivotal attachment, said side arms being spaced apart in plan view to permit human passenger's head to pass therethrough and being L-shaped in side view to restrain a passenger's shoulders toward the back of the seat, and means connected between said seat and said restraint arm through its said pivotable connection for selectively locking the restraint arm against movement away from said seat at any of a plurality of positions between its said extreme positions, said lcoking means including means operable only by an attendant outside of the vehicle for unlocking said restraint arm whereby the combination of the seat shape, restraint arm shape and locking means accommodates a wide range of passenger sizes with ease of entering and leaving said seat.

4. The mechanism of claim 3 wherein said selective holding means comprises a hydraulic cylinder and a piston therein slidably therealong from one cylinder end to the other, one of said cylinder and piston being operably attached to said seat and the other of said cylinder and piston being operably attached to said restraint arm in a manner to cause relative motion therebetween when said restraint arm is pivoted between its extreme positions, said selective holding means additionally including a liquid transfer path between said one and said another cylinder end and having a fluid control valve therein, thereby to make controllable permissible rotation of said restraining arm by control of said valve.

5. The mechanism of claim 4 wherein said valve is characterized by permitting fluid flow through said fluid path in only one direction or the other in response to a mechanical valve control being positioned in either a first or second position, whereby movement of said restraint arm may only be in one direction for a particular position of said valve.

6. The passenger seat assembly according to claim 3 wherein said extreme position of said restraint arm away from the seat positions said side arms above said pivotable attachment, thereby to make passenger loading and unloading from the seat especially easy.

7. The passenger seat assembly according to claim 3 wherein said selectively holding means is characterized by having one operating site permitting free movement of said restraint arm downward to any position between its said extreme positions while prohibiting upward movement, whereby said arm can be easily and conveniently positioned to accomodate people of a wide variety of sizes.

8. The passenger seat assembly according to claim 3 wherein said restraint arm is positively postionable with respect to said seat without any connection therewith except at the pivotable attachement of its free ends.

9. The passenger seat assembly according to claim 3 wherein said restraint arm is characterized by being unbendable, whereby it moves about said pivot as a single shape.

10. The passenger seat assembly according to claim 3 wherein the fixed seat is formed of a hard molded plastic shell having a smooth surface upon which a passenger sits.

11. A passenger seat assembly for a passenger vehicle, comprising:

a fixed passenger seat having a high back with a human headrest portion and a bucket like seat with raised sides to restrain a passenger against sideways motion out of said seat, a generally U shaped restraint arm pivotally attached at its free ends on opposite sides of said seat in its region of said headrest and rotatable between extreme positions toward and away from said seat, a horizontal middle section of said restraint arm positioned to rest on the passenger's lap and adjoining side arms between said horizontal section and said seat being spaced apart sufficient to permit a human passenger's head to pass therethrough, said restraint arm being surrounded with a soft padding material, a hydraulic cylinder and a piston therein slidable therealong from one cylinder end to the other, one of said cylinder and piston being operably attached to said seat and the other of said cylinder and piston being operably attached to said restraint arm in a manner to cause relative motion therebetween when said restraint arm is pivoted between it extreme positions, said movement control means additionally including a liquid transfer path between said one and said another cylinder end and having a fluid control valve therein, thereby to make controllable permissible rotation of said restraining arm by control of said valve, said valve characterized by permitting fluid flow through said fluid path in only one direction or the other in response to a mechanical valve control being positioned in either a first or second position, whereby movement of said restraint arm may only be in one direction for a particular position of said valve, mechanical means operably connected between said piston and said cylinder and connected to said mechanical valve control for restraining relative movement of said piston and said cylinder beyond a certain intermediate point when said mechanical valve control is in a position that prevents rotation of said restraint arm in an upward direction, said mechanical means being inoperative when said mechanical valve control is in its position permitting such motion of the restraint arm, whereby a mechanical backup is provided to the hydraulic restraint mechanism.

12. A passenger seat assembly for a passenger vehicle, comprising:

a fixed passenger seat having a high back with a human headrest portion and a bucket like seat with raised sides to restrain a passenger against sideways motion out of said seat, a generally U-shaped restraint arm pivotally attached at its free ends on opposite sides of said seat in its region of said headrest and rotatable between extreme positions toward and away from said seat, a horizontal middle section of said restraint arm positioned to rest on the passenger's lap and adjoining side arms between said horizontal section and said seat being spaced apart sufficient to permit a human passenger's head to pass therethrough, said restraint arm being surrounded with a soft padding material, a hydraulic cylinder attached to the rear surface of said seat in a generally upright position, a piston within said hydraulic cylinder movable from one end to the other, a shaft attached to said piston and extending completely through said hydraulic cylinder to exit therefrom in a liquid tight manner at opposite ends of the cylinder for all positions of said piston therealong, means connecting one end of said shaft operably to said restraint arm for moving said piston from one end of the hydraulic cylinder to the other as said restraint arm is rotated between its extreme upward and downward positions about said pivotable attachment, a liquid path external of said cylinder communicating between it opposite ends, thereby permitting fluid flow from one side of the piston to the other in the cylinder as said piston moves back and forth along said cylinder, and a control valve in said liquid path, said valve characterized by having two operable states selectable by a mechanical control, one of said states permitting fluid flow in one direction only and the other of said states permitting fluid flow in the opposite direction only, thereby permitting the passenger restraint arm to move only in an upward or a downward direction about said pivotable attachment depending on the position of said control valve.

13. The mechanism of claim 12 wherein an opposite end of said shaft includes a flange and further wherein the mechanism additonally comprises means operably associated with said valve control for positioning in the path of movement of said flange a mechanical stop to effectively prevent movement of said passenger restraint arm in an upward direction beyond an intermediate position when said valve is in its state that prevents such upward movement, whereby a mechanical backup system is provided to the hydraulic system to prevent movement of said passenger restraint arm in an upward direction when such movement is not desired.

14. A passenger seat assembly for a passenger vehicle, comprising:
  a fixed seat for carrying a single passenger and having a high back with a human headrest portion and a bucket like seat sloping downward from it front toward the back and having raised sides all to restrain a passenger against being urged out of said seat by the motion of said vehicle,
  a generally U shaped restraint arm pivotally attached at its free ends on opposite sides of said seat in its region of said headrest and rotatable between extreme positions toward and away from said seat, a horizontal middle section on said restraint arm positioned to rest on the passenger's lap and adjoining arms between said horizontal section and said pivotal attachment being spaced apart to permit a human passenger's head to pass therethrough and to restrain a passenger's shoulders toward the back of the seat,
  means connected between said seat and said restraint arm for selectively holding the restraint arm against movement away from said seat at any of a plurality of positions between its said extreme positions, whereby the combination of the seat shape, restraint arm shape and holding means accommodates a wide range of passenger sizes with ease of entering and leaving said seat, said selective holding means comprising:
  a hydraulic cylinder having a piston movable therealong between opposite ends thereof and a shaft attached to said piston and extending completely through said cylinder and through said opposite ends in a liquid tight manner for all positions of said piston therebetween, one of said cylinder and one of said shaft being fixed with respect to said vehicle and the other of said cylinder and said shaft being attached to said movable restraint mechanism, whereby movement of the restraint mechanism between its extreme passenger restraint and loading positions causes said piston to move between its said opposite ends of the cylinder,
  a fluid path external of said cylinder and connected to carry fluid between said opposite ends of said cylinder,
  fluid control means operably connected as part of said fluid path for permitting fluid to flow in only one direction when actuated into a first mode, that direction being such as to permit said passenger restraint means to move toward said seat but not away from the seat, said fluid control means allowing fluid to flow in an opposite direction when actuated into a second mode,
  a mechanical control operable between two positions relative to said vehicle and connected to actuate said fluid control means into its first and second modes when the mechanical control is, respectively, in its first and second position, and
  means cooperatively connectable with another end of said shaft for mechanically preventing relative movement between said cylinder and said shaft in a direction permitting the restraint mechanism to move beyond a fixed position toward its said loading position when said mechanical control is in its first position, thereby providing a mechanical backup to the hydraulic restraint of the passenger.

15. The passenger seat assembly according to claim 14 wherein said fluid control means is further characterized by permitting fluid travel in only one direction within said fluid path when in its said second mode, thereby to permit the passenger restraint means to move only away from said seat when said mechanical control is in its said second position.

* * * * *

UNITED STATES PATENT AND TRADEMARK OFFICE
CERTIFICATE OF CORRECTION

PATENT NO. : 4,005,877

DATED : February 1, 1977

INVENTOR(S) : Thomas Milton Humphries

It is certified that error appears in the above-identified patent and that said Letters Patent are hereby corrected as shown below:

Column 2, line 50 - "for" should be --four--;

Column 3, line 37 - "1" should be --21--;

Column 3, line 48 - "Referring" should start a new paragraph;

Column 4, line 57 - "2" should be --21--;

Column 4, line 66 - "it" should be --its--;

Column 5, line 58 - "2" should be --21--;

Column 6, line 1 - "retaining" should be --restraining--;

Column 6, line 50 - "it" should be --in--;

Column 7, line 22 - "slidable" is misspelt;

Column 7, line 49 - "site" should be --state--;

Column 7, line 58 - "attachment" is misspelt;

Column 10, line 16 - --end-- is left out after the word "one"; and

UNITED STATES PATENT OFFICE
CERTIFICATE OF CORRECTION

Patent No. 4,005,877      Dated February 1, 1977

Inventor(s) Thomas Milton Humphries

It is certified that error appears in the above-identified patent and that said Letters Patent are hereby corrected as shown below:

Column 10, line 44, insert -- in the direction -- after "position".

Signed and Sealed this

Sixth Day of September 1977

[SEAL]

Attest:

RUTH C. MASON
*Attesting Officer*

LUTRELLE F. PARKER
*Acting Commissioner of Patents and Trademarks*